United States Patent [19]

Höppner et al.

[11] Patent Number: 4,691,681
[45] Date of Patent: Sep. 8, 1987

[54] ARRANGEMENT FOR CONTROLLING THE INTAKE AIR FOR THE CARBURETOR OF A HAND-HELD PORTABLE TOOL

[75] Inventors: Klaus Höppner, Marbach; Bernhard Kiefel, Schorndorf-Schornbach, both of Fed. Rep. of Germany

[73] Assignee: Andreas Stihl, Waiblingen, Fed. Rep. of Germany

[21] Appl. No.: 878,622

[22] Filed: Jun. 26, 1986

[30] Foreign Application Priority Data

Jul. 4, 1985 [DE] Fed. Rep. of Germany ....... 3523949

[51] Int. Cl.⁴ ............................................. F02M 31/14
[52] U.S. Cl. .................... 123/556; 261/64.1; 261/144
[58] Field of Search ............. 123/556; 261/144, 64 R

[56] References Cited

U.S. PATENT DOCUMENTS

| | | | |
|---|---|---|---|
| 908,112 | 12/1908 | Longenecker | 123/556 |
| 1,319,271 | 10/1919 | Cunningham | 123/556 |
| 1,933,365 | 10/1933 | Chandler et al. | 123/556 |
| 2,429,208 | 10/1947 | Matthews et al. | 123/556 |
| 3,678,973 | 7/1972 | Loop | 123/556 |
| 4,175,524 | 11/1979 | Coddington | 123/556 |
| 4,526,156 | 7/1985 | Briche | 123/556 |

FOREIGN PATENT DOCUMENTS 58-10110 1/1983 Japan .................................. 123/556

Primary Examiner—Tim Miles
Attorney, Agent, or Firm—Walter Ottesen

[57] ABSTRACT

The invention is directed to an arrangement for controlling the intake air for the carburetor of a hand-held portable tool such as a motor-driven chain saw or the like. During winter operation, the cooling air that is heated by the engine cylinder is carried through a pass-through opening to the carburetor. During summer operation the pass-through opening is blocked by a slide that is pivotally mounted on a pivot axis. The slide selectively opens or closes the pass-through opening and is configured as a deflector which, in its open position baffles the heated cooling air from the engine cylinder and guides it toward the carburetor.

27 Claims, 7 Drawing Figures

ARRANGEMENT FOR CONTROLLING THE INTAKE AIR FOR THE CARBURETOR OF A HAND-HELD PORTABLE TOOL

FIELD OF THE INVENTION

The invention relates to an arrangement for controlling the intake air for the carburetor of a hand-held portable tool, such as a motor-driven chain saw or the like. The arrangement includes a pass-through opening which during cold-weather operation admits heated cooling air to the carburetor but which for hot-weather operation is closable via a slide that is pivoted about an axis.

BACKGROUND OF THE INVENTION

Motor-driven chain saws and other hand-held portable tools of this kind must always be capable of functioning even in extreme weather conditions, for instance, at $-30°$ C. during the winter and at $+30°$ C. in the summer. If the motor-driven chain saw is used in winter, it is known for the cooling air, heated at the engine cylinder, to be supplied to the carburetor as preheated intake air. The preheated intake air may be supplied either via a blower or, lacking a blower, merely by a suitable flow brought about by underpressure or overpressure. In summer operation, the pass-through opening for the heated cooling air leading to the carburetor must be closed. To this end, it is known to provide removable inserts with which the overflow openings in the housing can be covered.

Another arrangement is also known, in which the pass-through opening for the warm air that is to be supplied to the carburetor can be opened or closed selectively by a pivotally mounted flap. This hinged flap, which is pivotable about an axis, is substantially flat and merely effects opening or closure of the pass-through opening. Thus, when the hinged flap is open, only a relatively small portion of the total amount of heated cooling air flowing around the cylinder is delivered to the carburetor, while the remaining majority of the heated cooling air is vented directly into the open, as during summer operation. This has the substantial disadvantage that in winter operation, especially at extremely low outdoor temperatures and thus when the intake air is very cold, the heating of the carburetor is inadequate because the carburetor is supplied with too little preheated air. Inadequate heating of the carburetor during winter operation causes icing of the carburetor, or icing of the intake filter of the motor-driven chain saw depending on the weather conditions and on the possibility of snow entering the same, and so a malfunction-free operation is not assured.

SUMMARY OF THE INVENTION

It is an object of the invention to provide an arrangement of the type described above for controlling the intake air such that even in extremely cold situations, an adequate quantity of intensely heated cooling air is always supplied to the carburetor.

According to a feature of the arrangement of the invention, a slide that selectively opens or closes the pass-through opening is configured as a deflector leading toward the carburetor and, in its open position, baffles the heated cooling air.

When the slide is in its open position for winter operation, the heated cooling air that initially flows around the ribs of the cylinder head is dammed up or baffled at the slide. For this reason, the heated cooling air is constrained to flow such that most of the cooling air flowing around the cylinder head is guided all the way through the pass-through opening toward the carburetor. Because of the backup of heated cooling air at the open slide, not only is a greater quantity of warm air directed to the carburetor, but this air is also heated to a higher temperature, so that even at very low outdoor temperature icing cannot occur at the carburetor and/or filter of the engine; instead, satisfactory functioning is always assured.

BRIEF DESCRIPTION OF THE DRAWING

The invention will now be described with reference to the drawing, wherein.

DESCRIPTION OF THE PREFERRED EMBODIMENTS OF THE INVENTION

Figure 1:
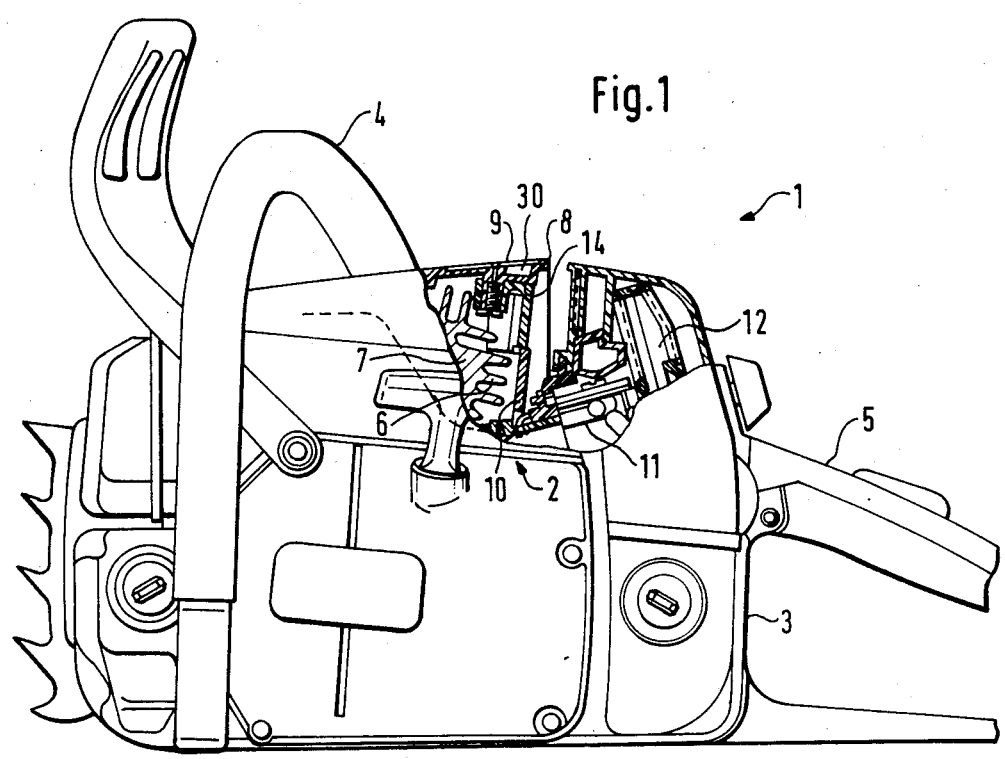
FIG. 1 is a side elevation view of a motor-driven chain saw with a portion of the housing broken away to show the arrangement according to the invention for controlling the intake air for the carburetor.

The portable tool shown in the drawing is embodied as a motor-driven chain saw 1 and has an internal combustion engine 2 which is disposed in a housing 3. The housing has a carrying handle 4 and an operating handle 5 at the back.

Figure 2:
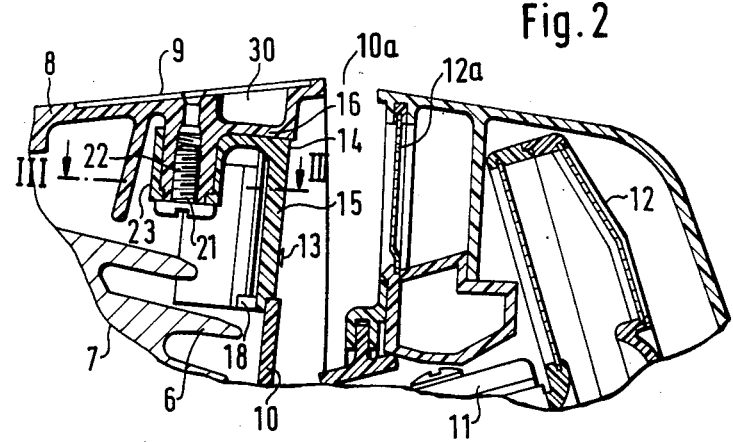
FIG. 2 is an enlarged fragmentary view, in section, of the upper portion of the motor-driven chain saw of FIG. 1.
Figure 5:
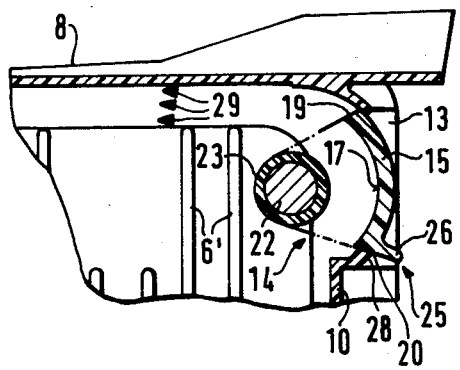
FIG. 5 is a sectional plan view similar to FIG. 3, but showing cooling ribs of the motor that extend in a vertical plane.
Figure 6:
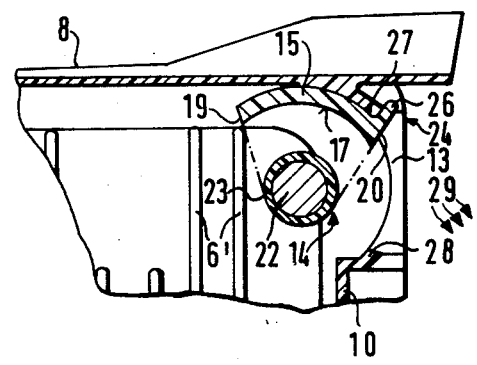
FIG. 6 is a plan view, similar to FIG. 5, but showing the slide in its open position; and, FIG. 7 is a fragmentary view of the slide and a detent to show how the slide can be held at positions between its open and closed positions.

The engine 2 has a cylinder 7 provided with cooling ribs 6 which is covered by a cover 8 of the housing 3. The cover 8 has an approximately horizontal top wall 9 and an approximately vertical transverse wall 10 adjacent a gap 10a in the housing 3 through which air enters into filter 12 after first passing through a prefilter 12a. The cylinder 7 is located on the left in the drawing, next to the transverse wall 10, and in the embodiment of FIGS. 1 to 3 its cooling ribs 6 are located approximately horizontally, that is, transversely to the cylinder axis. In the embodiment of FIGS. 5 and 6, the cylinder cooling ribs 6' are arranged vertically, that is, parallel to the longitudinal cylinder axis. On the right of the transverse wall 10 of the cover 8 as seen in FIGS. 1 and 2 are the carburetor 11 and the filter 12, through which the air for the mixture that is to be supplied to the engine 2 via the carburetor 11 is aspirated.

A preferably rectangular pass-through opening 13 is provided in the transverse wall 10 and can be selectively opened or closed via a slide 14. To this end, the slide 14 has a curved partially cylindrical wall 15. This wall 15 is mounted on an upper transversely projecting base plate 16 and is disposed to lie approximately vertically so as to be approximately in the plane of the transverse wall 10. The wall 15 is formed in such a way that the side facing the cylinder 7 is configured as a concavely curved deflecting face 17. On the end of the curved wall 15 opposite the base plate 16, there is a step-like protrusion 18, which overlaps the lower boundary edge of the pass-through opening 13 so that, in this lower edge region as well, the slide 14 is always properly guided and effects a tight closure.

As shown in FIGS. 3 to 6, the base plate 16 of the slide 14 is configured as a triangular part that becomes wider toward the two side edges 19, 20 of the wall 15. A pivot pin 21 is at the corner or apex portion opposite the wall 15 for pivotally supporting the slide 14. To provide this pivot support, a bearing journal 22 that extends downwardly is disposed on the top wall 9 of the cover 8, and a bearing sleeve 23 formed on the base plate 16 of the slide 14 is slipped onto the bearing journal 22. The pivot pin 21, by means of which the slide 14 is pivotally fixed on the bearing journal 22, is in the form of a threaded fastener in the embodiment shown, with its threaded portion threadably engaging the bearing journal 22.

Figure 7:
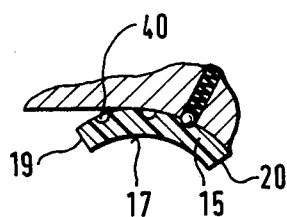

To enable pivoting the slide 14 into its open position 24 or its closed position 25 (FIGS. 3 to 6) by hand, it is advantageous to provide a handle 26 on the slide 14. In the present embodiment, the handle 26 is embodied as a protrusion formed on the wall 15 of the slide 14. The handle 26 extends into the region of the pass-through opening 13 and thus limits the pivoting movement of the slide 14 by striking the side edges 27, 28 of the opening 13. For accurate adjustment of the slide 14, it may also be advantageous to support the slide such that it is self-locking (for instance, by appropriate tightening of the pivot pin 21), to prevent unintentional pivoting, so that even when subjected to severe jolting, vibration or the like, the slide 14 will not be displaced in position. It may also be useful to arrange for latching the slide 14 in various adjusted positions by providing a plurality of detent positions 40 for the slide 14 on its wall 15 as shown in FIG. 7 or on its pivot support.

In the embodiment according to FIGS. 1 to 4, in which the cylinder 7 has horizontally located cooling ribs 6, it can be advantageous to provide an outlet opening 30 for venting the heated cooling air 29 during summer operation. This outlet opening 30 can preferably be provided in a side wall 31 of the cover 8 in such a way that the outlet opening 30 is offset by a considerable angle with respect to the pass-through opening 13. In hot-weather operation, that is, when the slide 14 is in its closed position 25 and is blocking the pass-through opening 13, the outlet opening 30 is uncovered, so that the heated cooling air 29 can flow out into the open without hindrance.

In the embodiment of FIGS. 5 and 6, a somewhat different guidance of the cooling air 29 is provided, in that one side edge 19 of the slide 14, in its open position 24 (FIG. 6), can be placed in a substantially seal-tight manner against one of the vertical cooling ribs 6' of the cylinder 7, which are disposed parallel to the pivot pin 21; as a result, the flow of cooling air 29 is baffled at the deflecting face 17 and is guided through the pass-through opening 13.

Figure 4:
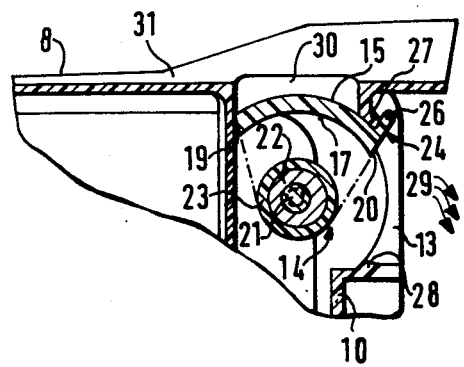
FIG. 4 is a sectional plan view corresponding to FIG. 3 but showing the slide in the open position.

In winter operation, the slide 14 is in its open position 24, so that the cooling air that has been preheated at the cylinder 7 flows toward the deflecting face 17 of the wall 15 and is baffled there because of the concave configuration and guided through the pass-through opening 13 toward the air-intake filter 12 of the carburetor 11. This is shown in FIG. 4 wherein the outlet opening 30 is blocked completely during winter operation, while the pass-through opening 13, in particular at very low outdoor temperatures, is completely uncovered, and so to the maximum possible extent, a large quantity of dammed-up or baffled, preheated cooling air 29 can reach the carburetor 11.

Figure 3:
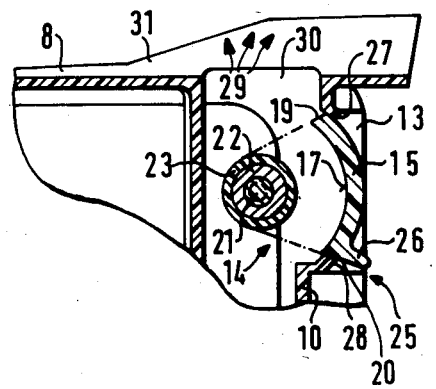
FIG. 3 is a plan view on the cover of the motor-driven chain saw of FIG. 2, in a section taken in an upper plane at line III—III of FIG. 2, showing the slide in the closed position.

FIG. 3 shows the slide 14 in its closed position 25, with the wall 15 completely blocking the pass-through opening 13. In contrast, the outlet opening 30 is completely uncovered, so that the heated cooling air 29 can flow unhindered into the open.

FIG. 5 shows the slide 14 in its closed position 25 once again. In this embodiment, however, no outlet opening is provided in the side wall 31 of the cover 8, and so during summer operation the cooling air heated at the cylinder 7 is vented to the outside via other openings in the housing 3, which are located farther away from the slide 14.

In winter operation, the slide 14, as shown in FIG. 6, is in a position pivoted by 90°, with one side edge 19 of the wall 15 resting in a seal-tight manner against one vertical cooling rib 6' of the cylinder 7. The pass-through opening 13 is uncovered completely, so that the cooling air that has been preheated at the cylinder 7 is initially baffled at the deflecting face 17 of the wall 15 and is then carried on through the pass-through opening 13 to the carburetor 11, so that once again, in this embodiment as well, a large quantity of baffled and hence more highly heated cooling air 19 reaches the carburetor 11.

It is understood that the foregoing description is that of the preferred embodiments of the invention and that various changes and modifications may be made thereto without departing from the spirit and scope of the invention as defined in the appended claims.

What is claimed is:

1. Arrangement for controlling the intake air for a carburetor of a hand-held portable tool such as a chain saw or the like which is suitable for both cold weather and hot weather operation, the portable tool also including a housing and an engine having a cylinder mounted in the housing, the arrangement comprising:
    pass-through passage means for passing heated cooling air from the cylinder across a gap in the housing to adjacent the inlet of the carburetor air cleaner during cold weather operation;
    a slide pivotally mounted in said housing and means for selectively moving the same about a pivot axis between a first position whereat said pass-through passage means is closed during hot-weather operation and a second position whereat said pass-through passage means is open so as to permit passage of said heated cooling air therethrough during said cold weather operation; and,
    said slide being configured as a deflecting member for baffling said heated cooling air and then guiding the same in the direction toward said carburetor.

2. The arrangement of claim 1, comprising means for holding said slide at a third position between said first position and said second position to prevent an unwanted pivotal displacement thereof.

3. The arrangement of claim 1, said slide having manipulating means formed thereon to facilitate manually manipulating said slide for movement between said positions.

4. The arrangement of claim 3, said manipulating means being a lug formed on said slide so as to project outwardly from said opening.

5. The arrangement of claim 1, said housing including a transverse wall disposed between said carburetor and said engine, said pass-through passage means being a pass-through opening formed in said transverse wall; and a cover covering said engine; said slide being pivotally mounted on said cover in the vicinity of said pass-through opening.

6. The arrangement of claim 5, said slide including a slide wall configured as a longitudinally extending portion of a cylinder and defining a concave wall surface for deflecting said heated cooling air toward said carburetor when said slide is in said second position.

7. The arrangement of claim 6, said cover having a side wall adjacent said roof wall and said transverse wall, said side wall having a venting opening displaced from said pass-through opening and formed therein for venting said heated cooling air to the ambient when said slide is in said first position, said slide being mounted on said cover so as to close off said venting opening when in said second position.

8. The arrangement of claim 6, said cover having a roof wall adjacent said transverse wall, said slide further including a base plate; and, pivot means for pivotally journalling said base plate on said roof wall, said slide wall mounted on said base plate so as to extend transversely therefrom.

9. The arrangement of claim 8, said transverse wall having a boundary edge defining said pass-through opening, said slide wall having an upper end at which the latter is joined to said base plate and a lower end having a step-like projection formed thereon for overlapping said boundary edge when said slide is in said first position.

10. The arrangement of claim 8, said pivot means including a journalling boss formed on said roof wall for pivotally journalling said base plate thereon; and, a threaded fastener threadably engaging said boss for holding said base plate on said boss.

11. The arrangement of claim 10, said pivot means further including a sleeve formed on said base plate for pivotally engaging said journalling boss.

12. The arrangement of claim 11, said slide wall having longitudinally extending edges and being mounted to said base plate so as to extend downwardly therefrom, said base plate being a triangularly shaped member having an apex whereat said sleeve is formed and having lateral side edges extending to respective ones of said longitudinal edges of said slide wall.

13. Arrangement for controlling the intake air for a carburetor of a hand-held portable tool such as a chain saw or the like which is suitable for both cold weather and hot weather operation, the portable tool also including a housing and an engine having a cylinder mounted in the housing, the arrangement comprising:

pass-through passage means for passing heated cooling air from the cylinder to the carburetor for cold weather operation;

a slide pivotally mounted in said housing and means for selectively moving the same about a pivot axis between a first position whereat said pass-through passage means is closed during hot-weather operation and a second position whereat said pass-through passage means is open so as to permit passage of said heated cooling air therethrough during said cold weather operation;

said slide being configured as a deflecting member for baffling said heated cooling air and then guiding the same in the direction toward said carburetor;

said housing including a transverse wall disposed between said carburetor and said engine, pass-through passage means being a pass-through opening formed in said transverse wall; and a cover covering said engine; said slide being pivotally mounted on said cover in the vicinity of said pass-through opening;

said slide including a slide wall configured as a longitudinally extending portion of a cylinder and defining a concave wall surface for deflecting said heated cooling air toward said carburetor when said slide is in second position;

said cover having a roof wall adjacent said transverse wall, said slide further including a base plate; and, pivot means for pivotally journalling said base plate on said roof wall, said slide wall mounted on said base plate so as to extend transversely therefrom;

said pivot means including a journalling boss formed on said roof wall for pivotally journalling said base plate thereon; and, a threaded fastener threadably engaging said boss for holding said base plate on said boss;

said pivot means further including a sleeve formed on said base plate for pivotally engaging said journalling boss;

said slide wall having longitudinally extending edges and being mounted to said base plate so as to extend downwardly therefrom, said base plate being a triangularly shaped member having an apex whereat said sleeve is formed and having lateral side edges extending to respective ones of said longitudinal edges of said slide wall; and, said cylinder having a cooling rib extending in a direction parallel to said pivot axis, said slide being mounted on said cover so as to cause one of said longitudinal edges to be in seal-tight contact with said cooling rib when in said second position.

14. Arrangement for controlling the intake air for a carburetor of a hand-held portable tool such as a chain saw or the like which is suitable for both cold weather and hot weather operation, the portable tool also including a housing and an engine having a cylinder mounted in the housing, the arrangement comprising:

the housing including a wall spaced from said engine;

said wall and said engine conjointly defining pass-through passage means for passing heated cooling air from the cylinder to the carburetor for cold weather operation; and, a slide mounted in said housing and means for selectively moving the same between a first position whereat said pass-through passage means is closed during hot-weather operation and a second position whereat said pass-through passage means is open so as to pass heated cooling air to the carburetor during said cold weather operation; and, said slide being configured as a deflecting member for baffling said heated cooling air and then guiding the same in the direction toward said carburetor.

15. The arrangement of claim 14, said slide being pivotally mounted in said housing for selectively moving the same about a pivot axis between said first and second positions.

16. The arrangement of claim 15, said housing including a transverse wall disposed between said carburetor and said engine, said pass-through passage means including a pass-through opening formed in said transverse wall; and a cover covering said engine; said slide being pivotally mounted on said cover in the vicinity of said pass-through opening.

17. The arrangement of claim 15, comprising means for holding said slide at a third position between said first position and said second position to prevent an unwanted pivotal displacement thereof.

18. The arrangement of claim 15, said slide having manipulating means formed thereon to facilitate manually manipulating said slide for movement between said positions.

19. The arrangement of claim 18, said manipulating means being a lug formed on said slide so as to project outwardly from said opening.

20. The arrangement of claim 15, said slide including a slide wall configured as a longitudinally extending portion of a cylinder and defining a concave wall surface for deflecting said heated cooling air toward said carburetor when said slide is in said second position.

21. The arrangement of claim 20, said cover having a side wall adjacent said roof wall and said transverse wall, said side wall having a venting opening displaced from said pass-through opening and formed therein for venting said heated cooling air to the ambient when said slide is in said first position, said slide being mounted on said cover so as to close off said venting opening when in said second position.

22. The arrangement of claim 20, said cover having a roof wall adjacent said transverse wall, said slide further including a base plate; and, pivot means for pivotally journalling said base plate on said roof wall, said slide wall mounted on said base plate so as to extend transversely therefrom.

23. The arrangement of claim 22, said transverse wall having a boundary edge defining said pass-through opening, said slide wall having an upper end at which the latter is joined to said base plate and a lower end having a step-like projection formed thereon for overlapping said boundary edge when said slide is in said first position.

24. The arrangement of claim 22, said pivot means including a journalling boss formed on said roof wall for pivotally journalling said base plate thereon; and, a threaded fastener threadably engaging said boss for holding said base plate on said boss.

25. The arrangement of claim 24, said pivot means further including a sleeve formed on said base plate for pivotally engaging said journalling boss.

26. The arrangement of claim 25, said slide wall having longitudinally extending edges and being mounted to said base plate so as to extend downwardly therefrom, said base plate being a triangularly shaped member having an apex whereat said sleeve is formed and having lateral side edges extending to respective ones of said longitudinal edges of said slide wall.

27. The arrangement of claim 26, said cylinder having a cooling rib extending in a direction parallel to said pivot axis, said slide being mounted on said cover so as to cause one of said longitudinal edges to be in seal-tight contact with said cooling rib when in said second position.

* * * * *